United States Patent [19]

Suh et al.

[11] Patent Number: 4,617,031
[45] Date of Patent: Oct. 14, 1986

[54] HYBRID DOUBLE HYDROCYCLONE-GRAVITY GAS/LIQUID SEPARATOR

[75] Inventors: Sung L. Suh, Orinda; Carter B. Reeds, Walnut Creek; Peter Van Scherpe, Foster City; William H. Silcox, San Francisco, all of Calif.

[73] Assignee: Chevron Research Company, San Francisco, Calif.

[21] Appl. No.: 705,813

[22] Filed: Feb. 26, 1985

[51] Int. Cl.$^4$ .............................................. B01D 53/24
[52] U.S. Cl. .......................................... 55/52; 55/174; 55/177; 55/203
[58] Field of Search ............... 55/52, 57, 171–177, 55/201–204, 38, 170

[56] References Cited

U.S. PATENT DOCUMENTS

| | | | |
|---|---|---|---|
| 3,212,232 | 10/1965 | McMinn | 55/178 X |
| 3,212,234 | 10/1965 | McMinn | 55/38 |
| 3,273,318 | 10/1966 | Meyer | 55/175 |
| 3,360,903 | 1/1968 | Meyer | 55/174 X |
| 4,093,428 | 6/1978 | Swogger | 55/52 |

OTHER PUBLICATIONS

Perry et al; Chemical Engineers' Handbook, 4th ed., 1963, pp. 20-68 and 20-69.

Primary Examiner—Charles Hart
Attorney, Agent, or Firm—S. R. LaPaglia; E. J. Keeling; P. L. McGarrigle

[57] ABSTRACT

An apparatus and method is disclosed for separating multiphasic mixtures of such things as gas and oil, from liquids, such as petroleum production fluids. It includes a centrifugal gas/liquid separator having a generally conical inner surface, a gas/liquid inlet located on this inner surface, an area for retaining the liquid and for allowing further gravity separation of the gas/liquid phase, an enclosure for the above mentioned elements, a gas outlet, and a liquid outlet.

The device functions by initially separating the gas from the oil by centrifugation in the conical separator, then by allowing the remaining liquid to further separate by gravity in the retention area.

12 Claims, 1 Drawing Figure

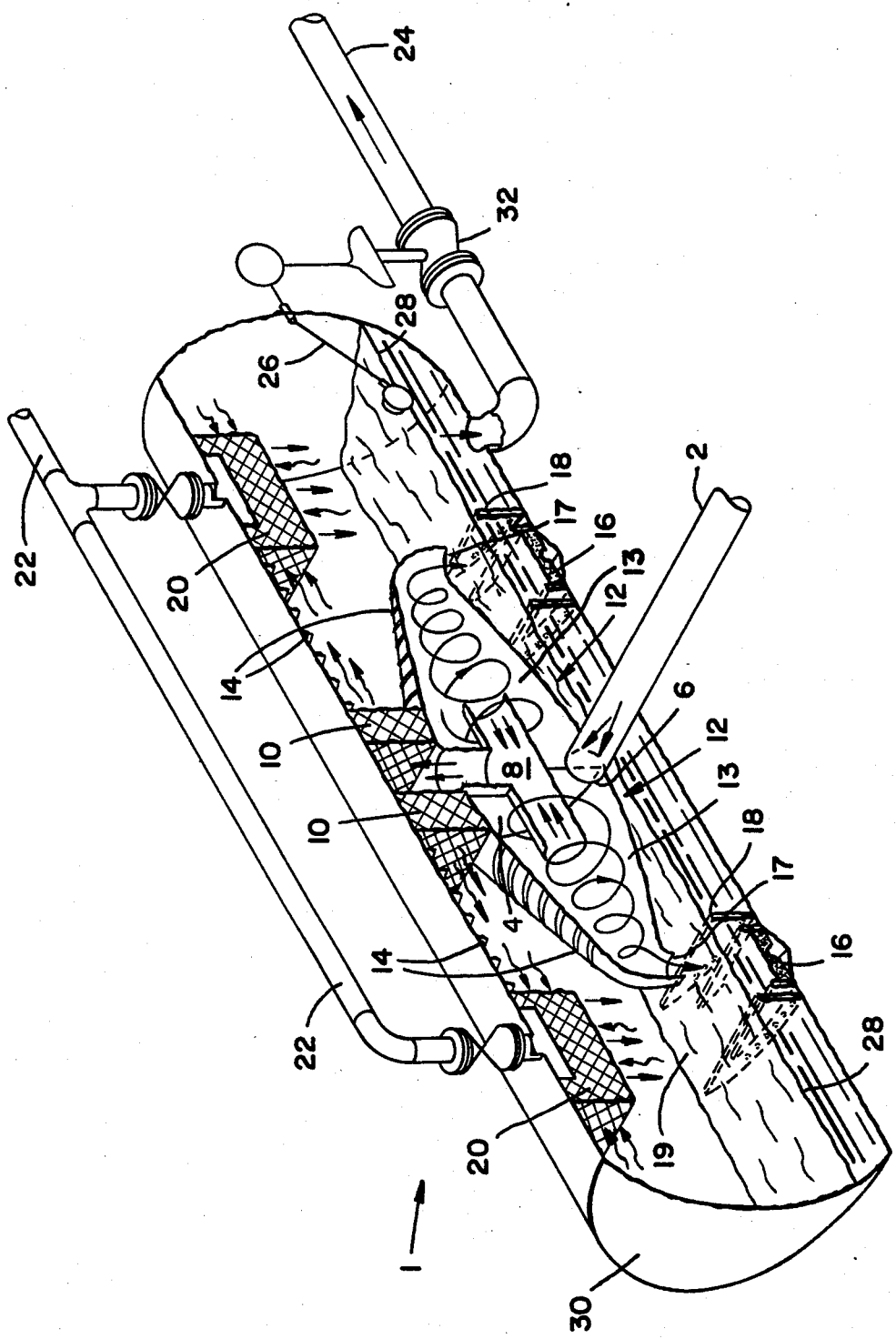

HYBRID DOUBLE HYDROCYCLONE-GRAVITY GAS/LIQUID SEPARATOR

FIELD OF THE INVENTION

This invention relates to a separatory apparatus. More specifically, to an apparatus designed to separate a liquid and a gas.

BACKGROUND OF THE INVENTION

Devices that separate gases, liquids, and solids work on a variety of principles, two of which are gravity and centrifugal force. Conventional gravity type separators have been widely used to separate a gas from a liquid (or vice versa) on land-based crude oil and gas process plants. These separators are generally quite large and heavy because the separation takes place over a longer period of time and to do so efficiently you need a larger volume of space. Examples of this type of separator are: Kotzebue, U.S. Pat. No. 1,782,783; Pittman, U.S. Pat. No. 1,994,110; Orrell, U.S. Pat. No. 2,767,802; and Ray, U.S. Pat. No. 2,887,174.

Other separators work by centrifugal force. Generally they accelerate the division of gas and liquid by increasing the separatory centrifugal forces. When a liquid/gas mixture is spun, the heavier object, i.e., the oil, makes its way through the mixture to the outermost point and the lighter gas migrates inward. Examples of liuqid/gas centrifugal force separators are: Moore, U.S. Pat. No. 3,713,279; Kartinen, U.S. Pat. No. 3,810,347; Reed et al., U.S. Pat. No. 4,035,171; Beattie, U.S. Pat. No. 4,070,168 and Hodgson, U.S. Pat. No. 4,187,089. Examples of sand centrifugal separators are: Stavenger, U.S. Pat. No. 3,259,246; Hill U.S. Pat. Nos. 2,539,019, 2,566,662 and 1,919,653; Hruby, Jr., U.S. Pat. No. 3,067,876; and Hume, U.S. Pat. No. 3,045,828.

Conventional gravity type separators have been widely used to separate gas from liquid (or vice versa) on land-based crude oil and gas process plants. The same equipment has also been employed on offshore production platforms in spite of significant associated installation costs due to its large space and weight requirements. It requires a large pressure vessel to provide a long enough retention time in order to separate and settle, by gravity, small liquid particles in the gas/liquid mixture. Similarly, the centrifugal force oil/gas separators have not been perfected for offshore use either.

Furthermore, the floating production platform, such as a tension leg platform, floating barge, or a semisubmersible, will experience significant motions due to constant wave, current, and wind forces. The separation performance of a gravity separator will be hampered significantly due to the turbulence generated by sloshing wave motions of the liquid caused by the vessel motions. To correct this problem even larger and heavier pressure vessels will be required to cope with this problem and consequently further costs will be increased further for the equipment and the structure supporting it.

One solution to the problem is to incorporate a set of double hydrocyclones inside a conventional horizontal (or vertical) gravity separator. This design takes advantage of both the centrifugal force of the hydrocyclone and gravity as in a conventional separator. Most of the basic separation will be done by the hydrocyclone so that the size of the pressure vessel will be greatly reduced. The result is a compact, lightweight separator at a significantly reduced equipment weight. Because the installation space requirement and the total associated costs are low, this system is suitable for offshore production platforms, in particular, for a floating production platform application.

As a result, it is the principal object of this invention to create a device for gas/liquid separation. It is a further object of this invention to create a device that is lighter, smaller, and cheaper than current gas/liquid separators.

SUMMARY OF THE INVENTION

The present invention involves an apparatus and method for the separation of a gas and a liquid from a well production fluid.

Components of the apparatus include an enclosing chamber, one outlet to allow gas and one to allow liquid to leave the enclosing chamber, and a device to control the liquid outflow. Within the enclosing chamber is a smaller chamber having an inner surface in the shape of two cones joined at the base and is constructed so that a retention space may be formed between both chambers. There is an inflow line for a stream of pressurized well production fluid with an outlet located on the involute inner surface of the smaller chamber. At this point a blade splits the fluid flow into a stream for each conical section. Lastly, there are two liquids outlets (at the points of the cones) and a gas outlet for the smaller chamber.

The apparatus separates the liquid/gas mixture into its component parts by directing flowing well fluid into the double hydrocyclone where it is split into two streams, one stream per hydrocyclone. The fluid is spun by its own velocity on the inner, conical surface of the hydrocyclone where a primary centrifugal separation takes place. Thereafter, the remaining liquid is directed to an area where it is retained for further separation by gravity. The gas that has been separated through the initial process travels through a primary demister, then out into the enclosed space of the total chamber where it mixes with gas that has evaporated from the liquid held in the retention area. From here the gas goes through a secondary demister and it leaves the system. The liquid leaves through an outlet valve which is controlled by an automatic float control or liquid level control.

BRIEF DESCRIPTION OF THE DRAWING

The drawing represents a cutaway view of the double hydrocyclone/gravity separator.

DETAILED DESCRIPTION OF THE EMBODIMENT

The present separator combines the cyclone concept (i.e., the use of centrifugal force to separate elements of different weights that occur in a mixture) with the advantages of the conventional gravity separator. In referring to the drawing, discloses the double hydrocyclone/gravity separator 1 encapsulated by a containment vessel 30. The separator 1 has a dual hydrocyclone 12 (shaped like two cones joined at their bases, having a common base and lying along a common axis, the axis of the cones being parallel to the axis of the containment vessel) to which is attached a well stream inflow 2 at an involute inlet 6. The double hydrocyclone inlet 2 is located at approximately the center of the axis of the containment vessel 30 (the inlet may be tangential or involute). At the inlet 6 a flow splitter is positioned to separate the gas/liquid mixture of well fluid into a stream for each cone section 13 of the dual hydrocyclone 12. A set of baffles 18 and a sand trap with an automatic dump valve 16 are also included in the bottom of separator 1. A cylindrical vortex finder 8 within the dual hydrocyclone 12 leads to a set of primary demisters 10 that treat the initially vaporized gas fraction of the gas/liquid mixture and remove aerosolized oil droplets. Turbulence generators 14 on the outer surfaces of the dual hydrocyclone 12 and the inner surface of the containment vessel 30 for the separator 1 help to coalesce liquid droplets from the gas flow. A pair of secondary demisters 20 appear upstream of a gas outlet pipe 22. A liquid outlet pipe 24 is provided for the accumulated, retained liquids and liquid control valve 32 is opened by liquid control 26 once the surface of the liquid 28 gets to a predetermined level (or any other level control device such as electronic control). A second liquid outlet may be provided if stagnation occurs.

The dual hydrocyclone/gravity device 1 works as follows. In the separator 1 a set of lightweight, dual hydrocyclones 12 is installed at the center of the separator 1 to perform a primary separation function as a pressurized, flowing gas/liquid mixture of well fluid enters through a well stream inflow 2. The primary separation is effected by the centrifugal force generated in a cone section 13 of the cyclone 12. The well fluid enters the cyclone involutely and is split by a flow splitter 33 (acting as a blade) into a stream for each cone section 13 of the cyclone 12. The gas/liquid mixture is spun by its own velocity on the inner surface of the cone section 13 of the hydrocyclone 12 and an initial separation takes place (the heavier liquid is spun on the inner surface of the cones while the lighter gas migrates inward). Any gas that is initially separated goes through the vortex finder 8, through a pair of primary demisters 10, and then into the open area of the separator 1. The liquid portion of the gas/liquid mixture is spun out through an aperture 17 in each cone section 13 of double hydrocyclone 12. The liquid is deposited in a compartment 19 which may be equipped with submerged baffles 18 so that the inflow of fluid will not create an excessive amount of turbulence for the entire liquid system. (The liquid is allowed to migrate throughout the bottom of the separator 1 and is retained to further separate the liquid and gas by gravity force.) If too much turbulence is created in the retained liquid the separation due to gravity would be hampered. These baffles 18 may be horizontal or vertical and are also incorporated to attenuate liquid sloshing motions when the separator 1 is installed on an offshore floating platform. The chamber 19 also may incorporate a sand trap 16 and an automatic dump valve (not shown) which are provided to remove accumulated sands/silts under the underflow of the cyclone aperture 17.

The liquid surface 28 may extend into other areas of the separator 1 and undergo further separation of the gas/liquid mixture due to gravity and evaporation. Any gas tht evaporates during this time (and its accompanying aerosolized liquid) may encounter turbulence generating strips 14 to help coalesce the liquid droplets from the gas flow. In the separator 1 a larger gas/liquid interface area is incorporated in order to provide a larger evaporation surface compared to an ordinary hydrocyclone separator.

Once evaporation has taken place, the gas may be effectively separated from the liquid by passing it through a secondary pair of demisters 20 and then through a gas outlet 22. These secondary dimesters 20, like the primary demisters 10, further remove airborne liquid droplets by taking advantage of the well known separation methods of impingement, change of flow direction, and flow velocity. These airborne liquid droplets are removed and then returned to the larger liquid body by gravity flow to the base of the containment vessel.

The removal of the separated liquid may be accomplished by an automatic control 16 (either a float or an electronic probe). Once the liquid level reaches a predetermined level, the liquid control opens the liquid outlet valve 32 and the separated liquid can be withdrawn from the separator 1 through the liquid outlet 24.

Additional functions of the separator 1 could be provided by adding further weirs for water-oil separation to provide a three-phase separator (i.e., gas/water/oil). Furthermore, lightweight construction material for internals may be used since they are not subjected to any significant loading.

Since many modifications and variations of the present invention are possible within the spirit of this disclosure, it is intended that the embodiment disclosed is only illustrative and not restrictive. For that reason, reference is made to the following claims rather than to the specific description to indicate the scope of this invention.

What is claimed is:

1. An apparatus for separation of a gas from a liquid in a multiphasic mixture, comprising:

an enclosing chamber having a generally cylindrical shape, and an axis through its center;

an outlet for allowing gas to leave the enclosing chamber;

an outlet for allowing liquid to leave the enclosing chamber;

means to control the liquid outflow;

a generally smaller chamber within the enclosing chamber, constructed so that a space may be formed between both chambers; the smaller chamber having an inner surface the shape of two cones which are joined at their bases, the bases of the cones being a common base and the axis of the cones being parallel to the axis of the enclosing chamber, the smaller chamber located generally in the center of the axis of the enclosing chamber;

an inflow line for pressurized well production fluid, the inflow line having an outlet located on the involute inner surface of the smaller chamber where the bases of the cones are joined;

a blade means for splitting the flow of production fluid into a stream for each conical section, the blade means being located at the inflow outlet;

two liquid outlets for the smaller chamber, the outlets being located at the point of each cone and directed downwards to the bottom of the enclosing chamber; and a gas outlet for the smaller chamber; so that pressurized well production may enter the smaller chamber through the inflow line and spin on the inner surface of the smaller chamber to initially separate a gas fraction from a substantially liquid fraction, whereby the residual, substantially liquid phase may have the majority of the remaining gas separated by gravity while in the space between the smaller chamber and the enclosing chamber 2. The apparatus for separating a gas from a liquid in a multiphasic mixture as recited in claim 1, further including a primary demister means located downstream from the gas outlet for the smaller chamber.

3. The apparatus for separating a gas from a liquid in a multiphasic mixture as recited in claim 2, further including a secondary demister means located upstream from the gas outlet for the enclosing chamber.

4. The apparatus for separating a gas from a liquid in a multiphasic mixture as recited in claim 3, further including gas turbulence generator means located on the inner surface of the enclosing chamber and the outer surface of the smaller chamber to help coalesce the airborne liquid droplets.

5. The apparatus for separating a gas from a liquid in a multiphasic mixture as recited in claim 2, further including a liquid retention area located at the outflow of the smaller chamber, the retention area being defined by baffles.

6. The apparatus for separating a gas from a liquid in a multiphasic mixture as recited in claim 3 further including a particulate trap and a means for removing accumulated particulates located within the liquid retention area.

7. The apparatus for separating a gas from a liquid in a multiphasic mixture as recited in claim 4, where the means for removing accumulated particulates is an automatic driving valve.

8. An apparatus for separation of a gas from a liquid in a multiphasic mixture, comprising:
    an enclosing chamber having a generally cylindrical shape and an axis through its center;
    an outlet for allowing gas to leave the enclosing chamber;
    an outlet for allowing liquid to leave the enclosing chamber;
    means to control the liquid outflow;
    a generally smaller chamber within the enclosing chamber, constructed so that a space may be formed between both chambers, the smaller chamber having an inner surface the shape of two cones which are joined at their bases, the bases of the cones being a common base and the axis of the cones being parallel into the axis of the enclosing chamber, the smaller chamber located generally in the center of the axis of the enclosing chamber;
    an inflow line for pressurized well production fluid, the inflow line having an outlet located on the involute inner surface of the smaller chamber where the bases of the cones are joined;
    a blade means for splitting the flow of production fluid into a stream for each conical section, the blade means being located at the inflow outlet;
    two liquid outlets for the smaller chamber, the outlets being located at the point of each cone and directed downwards to the bottom of the enclosing chamber;
    a gas outlet for the smaller chamber; and
    a liquid retention area located at the outflow of the smaller chamber, the retention area being defined by baffles.

9. A method of separating a gas from a liquid in a biphasic mixture comprising:
    flowing a pressurized stream of a biphasic mixture into a primary separator;
    spinning the biphasic mixture on the generally conical inner surface of a primary separator to partially separate gas from liquid by centrifugal force, said primary separator having a generally cylindrical shape and an axis through its center, and an inner surface in the shape of two cones, joined at the base, the bases of the cones being a common base and the axis of the cones being parallel to the axis of the enclosing chamber, the smaller chamber located generally in the center of the axis of the enclosing chamber, and said biphasic mixture is caused to flow in both conical sections of the separator by a blade that splits the initial stream into two smaller streams;
    retaining the residual liquid in an enclosed space for a period of time to separate more gas from the liquid by gravitational force;
    removing the gas fraction from the enclosed space;
    removing the liquid fraction from the enclosed space;
    reducing the turbulence at the point where the residual liquid flows out of the primary separator and into the enclosed space; and
    trapping and removing particulates that are present in the biphasic mixture.

10. The method for separating a biphasic mixture as recited in claim 9 further including removing aerosolized liquid.

11. The method for separating a biphasic mixture as recited in claim 10 further including retaining the separated gas in the enclosed space and removing the aerosolized liquid with a primary demister means, located at the point where the gas leaves the primary separator and enters the enclosed space, and a secondary demister means, located at the point the gas leaves the enclosed space to be withdrawn.

12. A method for the separation of a gas from a liquid in a gas/liquid mixture of well production fluid, comprising:
    flowing a pressurized stream of well production fluid that contains both gas and oil through an inflow line and then onto the inner, involute surfce of a first chamber having the shape of dual cones joined at the bases, the bases of the cones being a common base and the axis of the cones being parallel to the axis of an enclosing chamber, the first chamber located generally in the center of the axis of the enclosing chamber, the conically shaped sections of the chamber being located inside a larger enclosing chamber;
    splitting the stream of pressurized fluid, at the point the fluid meets the inner surface of the dual conical section into two streams, one for each cone section;
    spinning the pressurized well fluid on the inside surface of the conical sections;
    separating a portion of the gas that is contained in the well production fluid from the liquid by the centrifugal force that is generated as the well production fluid spins on the inner surfaces of the conically shaped sections;
    flowing the residual liquid portion of the well production fluid out of a liquid outflow located at the top of each conical section of the first chamber into an enclosed space described by the larger enclosing chamber;
    reducing the liquid turbulence at the liquid outflow for each conical section;
    trapping and removing particulates associated with the liquid portion of the well production fluid;
    retaining the residual liquid portion in the enclosed space long enough so that more gas may separate from the liquid portion;

flowing the separated gas fraction out of the first chamber into the enclosed space described by the larger enclosing chamber;

condensing aerosolized liquid from the gas with a primary demister as it passes from the first chamber of the enclosed space;

generating gas turbulence within the enclosed space to assist in coalescing aerosolized liquid droplets;

further condensing aerosolized liquid droplets with a secondary demister just before removing the gas from the enclosed space;

removing the accumulated gas from the enclosed space; and removing the accumulated liquid from the enclosed space when triggered by a liquid control device; so that pressurized well production fluid, containing gas and liquid, may be separated into liquid and gas fractions by utilizing the pressure in the fluid itself to initially spin most of the gas out of the liquid and then to allow gravity to substantially complete the separation by allowing the centrifuged liquid to remain in the device for a sufficient period of time.

* * * * *